(12) United States Patent
Juette

(10) Patent No.: US 10,933,798 B2
(45) Date of Patent: Mar. 2, 2021

(54) VEHICLE LIGHTING CONTROL SYSTEM WITH FOG DETECTION

(71) Applicant: Magna Electronics Inc., Auburn Hills, MI (US)

(72) Inventor: Reinhard Juette, Mainhausen (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 116 days.

(21) Appl. No.: 16/137,651

(22) Filed: Sep. 21, 2018

(65) Prior Publication Data

US 2019/0094136 A1 Mar. 28, 2019

Related U.S. Application Data

(60) Provisional application No. 62/561,702, filed on Sep. 22, 2017.

(51) Int. Cl.
| | | |
|---|---|---|
| *B60Q 1/08* | (2006.01) |
| *G01N 21/3554* | (2014.01) |
| *B60W 50/14* | (2020.01) |
| *G01S 17/95* | (2006.01) |
| *G01S 13/86* | (2006.01) |
| *G01S 13/931* | (2020.01) |
| *B60Q 1/20* | (2006.01) |
| *G01S 17/86* | (2020.01) |

(52) U.S. Cl.
CPC ............... *B60Q 1/085* (2013.01); *B60Q 1/08* (2013.01); *B60Q 1/20* (2013.01); *B60W 50/14* (2013.01); *G01N 21/3554* (2013.01); *G01S 13/867* (2013.01); *G01S 13/931* (2013.01); *G01S 17/86* (2020.01); *G01S 17/95* (2013.01); *B60Q 2300/312* (2013.01); *B60W 2555/20* (2020.02)

(58) Field of Classification Search
CPC . B60Q 1/085; B60Q 1/08; B60Q 1/20; B60Q 2300/312; G01S 13/931; G01S 13/867; G01S 17/95; G01S 17/86; G01N 21/3554; B60W 50/14; B60W 2555/20
See application file for complete search history.

(56) References Cited

U.S. PATENT DOCUMENTS

| | | |
|---|---|---|
| 5,550,677 A | 8/1996 | Schofield et al. |
| 5,670,935 A | 9/1997 | Schofield et al. |
| 5,786,772 A | 7/1998 | Schofield et al. |
| 5,929,786 A | 7/1999 | Schofield et al. |

(Continued)

FOREIGN PATENT DOCUMENTS

WO 2011090484 A1 7/2011

*Primary Examiner* — Dale W Hilgendorf
(74) *Attorney, Agent, or Firm* — Honigman LLP

(57) ABSTRACT

A fog detecting system for a vehicle includes a camera disposed at a vehicle and having a field of view forward of the vehicle, and a non-imaging sensor disposed at the vehicle and having a field of sensing forward of the vehicle. The camera captures image data and the non-imaging sensor captures sensor data. A control includes at least one data processor operable to process image data captured by the camera and sensor data captured by the non-imaging sensor. The control, responsive to processing of image data captured by the camera and processing of sensor data captured by the non-imaging sensor, determines presence of fog ahead of the vehicle and in the field of view of the camera and in the field of sensing of the non-imaging sensor.

20 Claims, 3 Drawing Sheets

(56) References Cited

U.S. PATENT DOCUMENTS

| | | | |
|---|---|---|---|
| 5,949,331 A | 9/1999 | Schofield et al. | |
| 6,061,015 A * | 5/2000 | Sugimoto | G01S 13/865 342/71 |
| 6,254,259 B1 * | 7/2001 | Kobayashi | B60Q 1/085 362/465 |
| 6,302,545 B1 | 10/2001 | Schofield et al. | |
| 6,396,397 B1 | 5/2002 | Bos et al. | |
| 6,498,620 B2 | 12/2002 | Schofield et al. | |
| 6,523,964 B2 | 2/2003 | Schofield et al. | |
| 6,587,186 B2 | 7/2003 | Bamji et al. | |
| 6,611,202 B2 | 8/2003 | Schofield et al. | |
| 6,636,258 B2 | 10/2003 | Strumolo | |
| 6,674,895 B2 | 1/2004 | Rafii et al. | |
| 6,678,039 B2 | 1/2004 | Charbon | |
| 6,690,268 B2 | 2/2004 | Schofield et al. | |
| 6,690,354 B2 | 2/2004 | Sze | |
| 6,710,770 B2 | 3/2004 | Tomasi et al. | |
| 6,802,617 B2 | 10/2004 | Schofield et al. | |
| 6,806,452 B2 | 10/2004 | Bos et al. | |
| 6,822,563 B2 | 11/2004 | Bos et al. | |
| 6,825,455 B1 | 11/2004 | Schwarte | |
| 6,876,775 B2 | 4/2005 | Torunoglu | |
| 6,882,287 B2 | 4/2005 | Schofield | |
| 6,891,563 B2 | 5/2005 | Schofield et al. | |
| 6,906,793 B2 | 6/2005 | Bamji et al. | |
| 6,919,549 B2 | 7/2005 | Bamji et al. | |
| 6,946,978 B2 | 9/2005 | Schofield | |
| 7,005,974 B2 | 2/2006 | McMahon et al. | |
| 7,038,577 B2 | 5/2006 | Pawlicki et al. | |
| 7,053,357 B2 | 5/2006 | Schwarte | |
| 7,145,519 B2 | 12/2006 | Takahashi et al. | |
| 7,157,685 B2 | 1/2007 | Bamji et al. | |
| 7,161,616 B1 | 1/2007 | Okamoto et al. | |
| 7,176,438 B2 | 2/2007 | Bamji et al. | |
| 7,203,356 B2 | 4/2007 | Gokturk et al. | |
| 7,208,723 B2 * | 4/2007 | Takenaga et al. | B60S 1/0818 250/227.25 |
| 7,212,663 B2 | 5/2007 | Tomasi | |
| 7,230,640 B2 | 6/2007 | Regensburger et al. | |
| 7,248,283 B2 | 7/2007 | Takagi et al. | |
| 7,283,213 B2 | 10/2007 | O'Connor et al. | |
| 7,295,229 B2 | 11/2007 | Kumata et al. | |
| 7,301,466 B2 | 11/2007 | Asai | |
| 7,310,431 B2 | 12/2007 | Gokturk et al. | |
| 7,321,111 B2 | 1/2008 | Bamji et al. | |
| 7,340,077 B2 | 3/2008 | Gokturk et al. | |
| 7,352,454 B2 | 4/2008 | Bamji et al. | |
| 7,375,803 B1 | 5/2008 | Bamji | |
| 7,379,100 B2 | 5/2008 | Gokturk et al. | |
| 7,379,163 B2 | 5/2008 | Rafii et al. | |
| 7,405,812 B1 | 7/2008 | Bamji | |
| 7,408,627 B2 | 8/2008 | Bamji et al. | |
| 7,423,752 B2 * | 9/2008 | Leleve et al. | B60Q 1/1423 356/338 |
| 7,592,928 B2 | 9/2009 | Chinomi et al. | |
| 7,720,580 B2 | 5/2010 | Higgins-Luthman | |
| 7,855,755 B2 | 12/2010 | Weller et al. | |
| 7,859,565 B2 | 12/2010 | Schofield et al. | |
| 7,881,496 B2 | 2/2011 | Camilleri et al. | |
| 8,013,780 B2 | 9/2011 | Lynam | |
| 8,027,029 B2 | 9/2011 | Lu et al. | |
| 8,694,224 B2 | 4/2014 | Chundrlik, Jr. et al. | |
| 8,818,042 B2 | 8/2014 | Schofield et al. | |
| 8,886,401 B2 | 11/2014 | Schofield et al. | |
| 8,917,169 B2 | 12/2014 | Schofield et al. | |
| 9,036,026 B2 | 5/2015 | Dellantoni et al. | |
| 9,068,390 B2 | 6/2015 | Ihlenburg et al. | |
| 9,077,098 B2 | 7/2015 | Latunski | |
| 9,077,962 B2 | 7/2015 | Shi et al. | |
| 9,090,234 B2 | 7/2015 | Johnson et al. | |
| 9,092,986 B2 | 7/2015 | Salomonsson et al. | |
| 9,097,800 B1 * | 8/2015 | Zhu | G01S 13/865 |
| 9,140,789 B2 | 9/2015 | Lynam | |
| 9,146,898 B2 | 9/2015 | Ihlenburg et al. | |
| 9,174,574 B2 | 11/2015 | Salomonsson | |
| 9,205,776 B2 | 12/2015 | Turk | |
| 9,233,641 B2 | 1/2016 | Sesti et al. | |
| 9,514,373 B2 * | 12/2016 | Jeromin et al. | B60Q 1/143 |
| 9,575,160 B1 | 2/2017 | Davis et al. | |
| 9,599,702 B1 | 3/2017 | Bordes et al. | |
| 9,689,967 B1 | 6/2017 | Stark et al. | |
| 9,753,121 B1 | 9/2017 | Davis et al. | |
| 2010/0245066 A1 | 9/2010 | Sarioglu et al. | |
| 2014/0049973 A1 * | 2/2014 | Adachi et al. | B60Q 1/085 362/465 |
| 2014/0324266 A1 * | 10/2014 | Zhu et al. | G01S 17/86 701/23 |
| 2014/0336935 A1 * | 11/2014 | Zhu et al. | G01S 17/86 702/3 |
| 2016/0116593 A1 * | 4/2016 | Kim et al. | G01S 17/86 701/70 |
| 2017/0031017 A1 * | 2/2017 | Jin et al. | G01S 13/867 |
| 2017/0222311 A1 | 8/2017 | Hess et al. | |
| 2017/0254873 A1 | 9/2017 | Koravadi | |
| 2017/0276788 A1 | 9/2017 | Wodrich | |
| 2017/0315231 A1 | 11/2017 | Wodrich | |
| 2017/0356994 A1 | 12/2017 | Wodrich et al. | |
| 2018/0015875 A1 | 1/2018 | May et al. | |
| 2018/0045812 A1 | 2/2018 | Hess | |
| 2018/0231635 A1 | 8/2018 | Woehlte | |
| 2018/0284226 A1 * | 10/2018 | LaChapelle et al. | G01S 17/95 |
| 2019/0339382 A1 | 11/2019 | Hess et al. | |

\* cited by examiner

VEHICLE LIGHTING CONTROL SYSTEM WITH FOG DETECTION

CROSS REFERENCE TO RELATED APPLICATION

The present application claims the filing benefits of U.S. provisional application Ser. No. 62/561,702, filed Sep. 22, 2017, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

Lighting control systems are currently made in a way to detect the light brightness outside of a vehicle for turning the rear and head lights (beside possible daytime running lights, which may be always on) on when it is getting dark. Typical solutions have light sensitive sensors or cameras. Rain sensors are known for detecting rain or hail. Some systems may automatically turn on the vehicle lights upon a defined rain or hail intensity. Typically these turn on the windshield wipers.

SUMMARY OF THE INVENTION

The present invention provides a driver assistance system for a vehicle that utilizes one or more cameras to capture image data representative of images exterior of the vehicle, and one or more non-imaging sensors to capture sensor data. The present invention provides a fog detecting system that includes a control comprising at least one processor operable to process image data captured by the camera and sensor data captured by the non-imaging sensor. The control, responsive to processing of image data captured by the camera and processing of sensor data captured by the non-imaging sensor, is operable to detect fog ahead of the vehicle. The determination of fog (or other reduced visibility condition) may be achieved by comparing signals or outputs derived from processing of captured image data with signals or outputs derived from processing of captured sensor data.

For example, the system may detect an object approaching the vehicle (such as ahead of the vehicle and at or in or near the path of travel of the vehicle) via a non-imaging sensor (such as a RADAR sensor or the like), and the system may also utilize an imaging sensor or camera to capture image data of the area ahead of the vehicle to detect objects or vehicles ahead of the equipped vehicle. The distance at which the object or vehicle is first detected by the camera (such as by processing of image data captured by the camera) as the object and vehicle approach one another is dependent on the visibility ahead of the vehicle and thus is adversely affected if fog is present ahead of the vehicle.

Thus, when the camera first detects a vehicle that is closer to the equipped vehicle than a threshold distance (such as a distance selected based on the resolution of the camera and/or lens of the camera, such as a distance at which the camera can detect objects under normal (e.g., daytime, with no fog, rain, dust) visibility conditions), the system determines that there is fog (or other visibility hindering condition) ahead of the vehicle. The system may adjust a lighting system of the vehicle or a driving or cruise control system of the vehicle responsive to determination that fog (or other reduced visibility condition) is present forward of the vehicle.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide a display, such as a rearview display or a top down or bird's eye or surround view display or the like.

Figure 1:
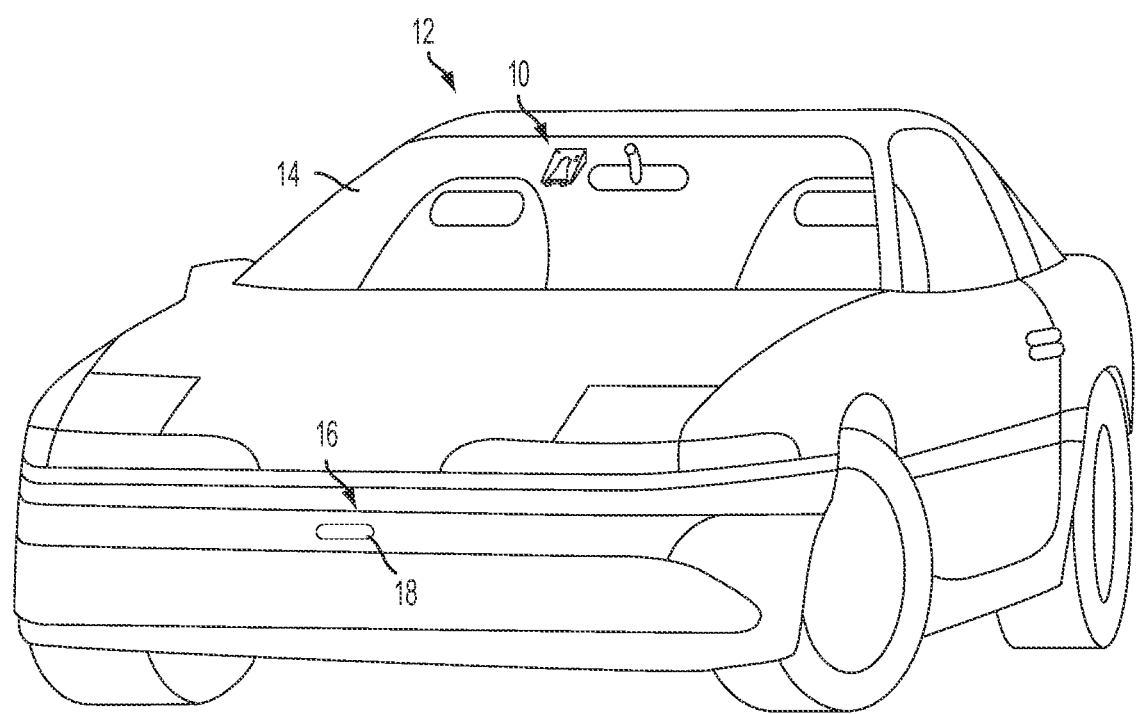
FIG. 1 is a perspective view of a vehicle with a fog detecting system that incorporates cameras and non-imaging sensors in accordance with the present invention.

Referring now to the drawings and the illustrative embodiments depicted therein, a sensing system for a vehicle 12 includes at least one exterior viewing imaging sensor or camera 10, such as a forward viewing imaging sensor or camera, which may be disposed at and behind the windshield 14 of the vehicle and viewing forward through the windshield so as to capture image data representative of the scene occurring forward of the vehicle (FIG. 1). Optionally, the system may include multiple exterior viewing imaging sensors or cameras, such as a forward viewing camera at the front of the vehicle, and a sideward/rearward viewing camera at respective sides of the vehicle, and a rearward viewing camera at the rear of the vehicle, which capture images exterior of the vehicle. The camera or cameras each include a lens for focusing images at or onto an imaging array or imaging plane or imager of the camera. Optionally, the forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The system of the present invention also utilizes a radar or lidar sensing system 16, which has a forward sensing sensor 18 (or plurality of sensors) disposed at a forward portion of the vehicle and sensing forward of the vehicle in the direction of travel of the vehicle. The forward field of view of the forward viewing camera at least in part encompasses or overlaps the forward field of sensing of the forward sensing sensor. Also, the forward range of sensing by the forward sensing non-imaging sensor is greater than a forward range of imaging by the forward viewing camera. The system includes a control or electronic control unit (ECU) or processor that is operable to process image data captured by the camera or cameras and may detect objects or the like and/or provide displayed images at a display device for viewing by the driver of the vehicle. The data transfer or signal communication from the camera to the ECU may comprise any suitable data or communication link, such as a vehicle network bus or the like of the equipped vehicle.

Current light control systems are unable to detect dust, fog (or clouds) or reduced visibility such as due to snowfall. Approaches are known at which the fog level gets determined by frequency filtering (La Place). That approach does not deliver reliable results since a road scene's inherent frequency spectrum is strongly dependent on the scene's content, which is heavily changing while a vehicle is moving.

The system of the present invention provides for detection of dust, fog (or clouds or water vapor), reduced visibility by snowfall or otherwise reduced visibility by any other particles such as raindrops, hail, spray pollen or swarms of insects.

Many vehicles include imaging or optical detection systems including, for example, one or more forward directed cameras, stereo cameras, near infrared and/or far infrared cameras. Vehicles may also include non-optical or non-imaging systems, such as ultrasonic sensors, near infrared based Lidar sensors (flash or scanning) and/or Radar sensors. A property of the RADAR sensors is that there is little signal attenuation due to the influence of fog (or water vapor). The LIDAR's infrared LASER frequency is often already selected in a way to minimize attenuation by humid air, and by that the LIDAR sensors penetrate fog, but the signal gets attenuated, and therefore the LIDAR's range gets limited by fog. Visual (RGB) mono and stereo camera vision is diminished by fog comparable to the congestion of the human eye, since visible light gets scattered on the fog drops. Generally, the signal of shapes becomes less sharp and the contrast decreases as the fog gets stronger or more dense.

Figure 2:
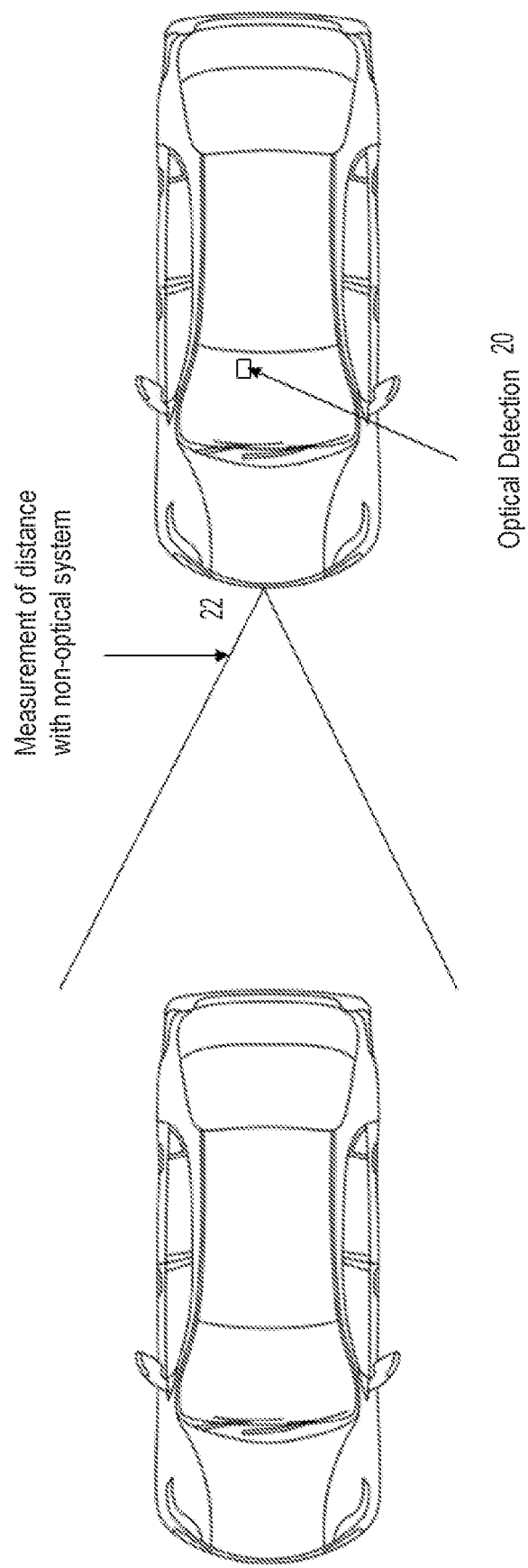
FIG. 2 is a plan view of the vehicle of FIG. 1.

As shown in FIG. 2, the vehicle equipped with the fog determining system of the present invention includes an imaging or optical detection system 20 including, for example, one or more forward directed cameras, stereo cameras, near infrared and/or far infrared cameras, and a non-optical or non-imaging system 22, such as RADAR and/or LIDAR and/or the like. Either by using structure from motion or other depth determination methods from a mono camera or by using a stereo camera, the RGB camera image processing may produce a depth map based on or derived from image data captured by these cameras. By comparing the image depth map with a depth map from LIDAR or RADAR or both, the current (RGB camera) visibility can be determined without the need of running sophisticated filters. Optionally, when present, an infrared camera's captured image data may also find use in the comparison. There may be a score which is higher the more feature points of the LIDAR or RADAR match with the feature points of the RGB depth map. A lower score may indicate that there is denser fog present. As an alternative solution, a borderline or borderline interval or threshold may be detectable from which depths the feature points of the LIDAR or RADAR do not match with the feature points of the RGB depth map. That borderline or threshold may be the visibility borderline.

As an optional addition or alternative, fog may be determined by classifying the area in the camera's view near the head lights. Since the fog strongly reflects the light coming from the headlights, there is always a bright halo around the head lights when it is foggy. Denser fog increases the intensity of the halo. A classification algorithm may classify the image of that area producing a measure for the fog density.

Figure 3:
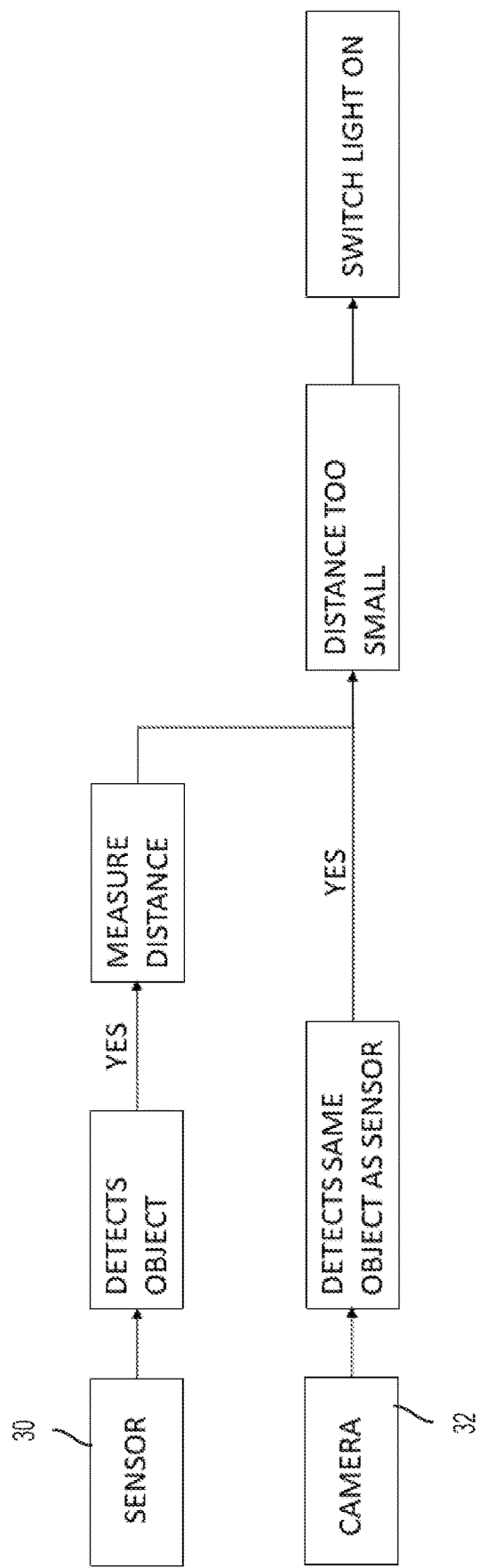
FIG. 3 is a block diagram of the fog detecting system of the present invention.

As shown in FIG. 3, the system may include both a non-optical sensor 30 and an optical sensor 32. When the optical sensor 32 detects an object, the non-optical sensor 30 determines a distance to the same object. If the determined distance is at or below a threshold distance (at the time the object is initially detected via processing of image data captured by the optical sensor or camera as the object and equipped vehicle approach one another), the system responds, for example, by switching on additional lighting (e.g., head lights or fog lights) and/or alerting the driver. Optionally, the system may reduce speed and/or enable a speed limiter or other defensive driving techniques.

Because the distance at which the optical sensor 32 initially detects the object (as the object approaches or gets closer to the vehicle) is dependent upon fog intensity (or other visibility reducing condition, such as rain or snow or dust or the like) and because the distance determination capabilities of the non-optical sensor 30 are substantially unaffected by fog intensity, the system determines a level or degree of fog intensity based on the distance at which the optical sensor 32 initially detects the approaching object. Optionally, the non-optical sensor 30 may determine that the distance to an object satisfies a threshold (i.e., is at or below a threshold distance indicative of the presence of fog) before the object is detected by the optical sensor 32, and thus may enable the fog lights (or other appropriate action) without optical sensor 32 detection of the object. The non-optical sensor 30 may continually or periodically determine the distance to the detected object or may determine distance to the object only upon detection of the object by the optical sensor 32.

For example, the viewing range of a forward facing camera during daytime or nighttime conditions can be 150 meters or more, depending on the optics, width of field of view, and imager pixel count or resolution used. Such camera configurations effectively form a distance resolution for a forward facing camera as installed on a vehicle. When fog is present, the distance resolution (i.e., how far forward of the vehicle the camera can first distinguish presence of an object ahead of the vehicle) decreases. Thus, if the distance resolution at which a camera first registers or determines presence of an object ahead of the vehicle is less than the distance resolution normally achieved by the camera during normal non-foggy driving conditions, the presence of fog can be inferred (due to the current distance resolution being less than a threshold distance normal for that camera in non-foggy conditions). For example, a given camera, during non-foggy driving conditions, can have a distance resolution of farthest-away object detection of about 150 meters or more. However, in foggy conditions, this first object detection distance can drop to 50 meters or less. Thus, a threshold distance used in the system of the present invention may be 50 meters or 75 meters (or more or less), and the threshold distance may be selected based on the camera optics, pixel resolution, and/or field of view (narrow versus wide) or the like.

Vehicle applications such as, for example, automated speed control (advanced adaptive cruise control or ACC) or speed warning functions may use the fog density information for adapting the vehicle speed properly or for a warning when driving faster than the visibility distance allows for safe driving. Automated vehicle light controls may switch on the driving lights responsive to a threshold determined fog density and may turn on the fog lights responsive to a second threshold indicative of denser fog conditions (or rain, snowfall or other visibility diminishing weather conditions).

The more dense the degree of fog present ahead of the vehicle is, the closer to the vehicle the object is when it is first detected or distinguished or determined by the camera (via processing of image data captured by the camera). Thus, the distance ahead of the vehicle at which the object is detected is indicative of the degree of fog present during that driving event. If the degree of fog is sufficiently high or greater than a threshold degree of fog, with such degree of fog indicated by the closeness to the vehicle when the object is first detected, the fog lights of the vehicle may be automatically activated. For example, if the distance is 25 meters or less, a higher degree of fog may be inferred, and the fog lights may be activated to enhance visibility in the foggy driving conditions.

Optionally, fog lights may be activated (or speed reduced, etc.) before the camera determines or distinguishes the object. For example, if the object is determined (via processing of sensor data captured by the non-imaging sensor) to be 25 meters away, but the camera has yet to determine the presence of the object, the presence of fog or other visibility reducing conditions may be inferred and the system can undertake appropriate action (e.g., alerting the driver and/or adjusting adaptive cruise control and/or activating the fog lights).

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from MOBILEYE Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

Optionally, the camera may comprise a forward viewing camera, such as disposed at a windshield electronics module (WEM) or the like. The forward viewing camera may utilize aspects of the systems described in U.S. Pat. Nos. 8,256,821; 7,480,149; 6,824,281 and/or 6,690,268, and/or U.S. Publication Nos. US-2015-0327398; US-2015-0015713; US-2014-0160284; US-2014-0226012 and/or US-2009-0295181, which are all hereby incorporated herein by reference in their entireties.

The system may utilize sensors, such as radar or lidar sensors or the like. The sensing system may utilize aspects of the systems described in U.S. Pat. Nos. 9,753,121; 9,689,967; 9,599,702; 9,575,160; 9,146,898; 9,036,026; 8,027,029; 8,013,780; 6,825,455; 7,053,357; 7,408,627;

7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 6,919,549; 6,906,793; 6,876,775; 6,710,770; 6,690,354; 6,678,039; 6,674,895 and/or 6,587,186, and/or International Publication Nos. WO 2018/007995 and/or WO 2011/090484, and/or U.S. Publication Nos. US-2018-0231635; US-2018-0045812; US-2018-0015875; US-2017-0356994; US-2017-0315231; US-2017-0276788; US-2017-0254873; US-2017-0222311 and/or US-2010-0245066, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A fog detecting system for a vehicle, said fog detecting system comprising:
   a camera disposed at the vehicle and having a field of view forward of the vehicle, said camera capturing image data as the vehicle travels along a road;
   a non-imaging sensor disposed at the vehicle and having a field of sensing forward of the vehicle, said non-imaging sensor capturing sensor data as the vehicle travels along the road;
   a control comprising at least one data processor operable to process image data captured by said camera and to process sensor data captured by said non-imaging sensor;
   wherein said control determines presence of an object forward of the vehicle present in the field of sensing of said non-imaging sensor based on processing at said at least one data processor of sensor data captured by said non-imaging sensor;
   wherein said control is operable to determine distance to the detected object via processing at said at least one data processor of sensor data captured by said non-imaging sensor as the vehicle moves along the road;
   wherein said control determines a first distance to the detected object when said control first determines presence of the object in the field of sensing of said non-imaging sensor based on processing at said at least one data processor of sensor data captured by said non-imaging sensor;
   wherein, as the vehicle moves further along the road after determining the first distance to the detected object, said control determines presence of the object forward of the vehicle in the field of view of said camera based on processing at said at least one data processor of image data captured by said camera;
   wherein said control determines a second distance to the detected object when said control first determines presence of the object within the field of view of said camera based on processing at said at least one data processor of image data captured by said camera; and
   wherein said control determines presence of fog ahead of the vehicle responsive to difference between the determined second distance and the determined first distance being at or above a threshold amount.

2. The fog detecting system of claim 1, wherein said non-imaging sensor comprises a LIDAR sensor.

3. The fog detecting system of claim 1, wherein said non-imaging sensor comprises a RADAR sensor.

4. The fog detecting system of claim 1, wherein said control, responsive to determination that fog is present ahead of the vehicle, adjusts a lighting system of the vehicle.

5. The fog detecting system of claim 4, wherein said control, responsive to determination that fog is present that is greater than a threshold degree of fog, actuates fog lights of the vehicle.

6. The fog detecting system of claim 1, wherein said control, responsive to detection of fog ahead of the vehicle, adjusts an adaptive cruise control system of the vehicle.

7. The fog detecting system of claim 1, wherein said control, responsive to detection of fog ahead of the vehicle, generates an alert to a driver of the vehicle.

8. The fog detecting system of claim 1, wherein said control, responsive to processing at said at least one data processor of image data capture by said camera, detects a headlight halo, and wherein said control, responsive to processing of image data captured by said camera, determines an intensity of the detected headlight halo, and wherein said control, responsive to the determined headlight halo intensity, determines a fog density of the detected fog.

9. The fog detecting system of claim 1, wherein said control, responsive to processing at said at least one data processor of image data captured by said camera, produces a camera depth map, and wherein said control compares the camera depth map with a depth map derived from sensor data captured by said non-imaging sensor to determine presence of fog ahead of the vehicle, and wherein said control determines a score indicative of matching feature points determined from the comparison, and wherein said control determines that fog is present ahead of the vehicle when the determined score is below a threshold score.

10. A fog detecting system for a vehicle, said fog detecting system comprising:
    a camera disposed at the vehicle and having a field of view forward of the vehicle, said camera capturing image data as the vehicle travels along a road;
    a non-imaging sensor disposed at the vehicle and having a field of sensing forward of the vehicle, said non-imaging sensor capturing sensor data as the vehicle travels along the road;
    a control comprising at least one data processor operable to process image data captured by said camera and to process sensor data captured by said non-imaging sensor;
    wherein said control, via processing at said at least one data processor of sensor data captured by said non-imaging sensor, determines presence of an object in the field of sensing of said non-imaging sensor and ahead of and being approached by the vehicle;
    wherein said control, via processing at said at least one data processor of sensor data captured by said non-imaging sensor as the vehicle moves along the road, determines a first distance to the detected object when said control first determines presence of the object in the field of sensing of said non-imaging sensor based on processing at said at least one data processor of sensor data captured by said non-imaging sensor;
    wherein, as the vehicle moves further along the road after determining the first distance to the detected object, said control determines presence of the object forward of the vehicle in the field of view of said camera via processing at said at least one data processor of image data captured by said camera;
    wherein said control, via processing at said at least one data processor of sensor data captured by said non-imaging sensor as the vehicle moves further along the road, determines a second distance to the detected object when said control first determines presence of the object within the field of view of said camera based on processing at said at least one data processor of image data captured by said camera; and wherein said control determines presence of fog ahead of the vehicle responsive to difference between the determined second distance and the determined first distance being at or above a threshold amount.

11. The fog detecting system of claim 10, wherein said non-imaging sensor comprises a LIDAR sensor.

12. The fog detecting system of claim 10, wherein said non-imaging sensor comprises a RADAR sensor.

13. The fog detecting system of claim 10, wherein said control, responsive to determination that fog is present ahead of the vehicle, adjusts a lighting system of the vehicle.

14. The fog detecting system of claim 13, wherein said control, responsive to determination that fog is present that is greater than a threshold degree of fog, actuates fog lights of the vehicle.

15. The fog detecting system of claim 10, wherein said control, responsive to determination that fog is present ahead of the vehicle, adjusts an adaptive cruise control system of the vehicle.

16. The fog detecting system of claim 10, wherein said control, responsive to determination that fog is present ahead of the vehicle, generates an alert to a driver of the vehicle.

17. The fog detecting system of claim 10, wherein said control, responsive to processing at said at least one data processor of image data capture by said camera, detects a headlight halo, and wherein said control, responsive to processing of image data captured by said camera, determines an intensity of the detected headlight halo, and wherein said control, responsive to the determined headlight halo intensity, determines a fog density of the determined fog.

18. A fog detecting system for a vehicle, said fog detecting system comprising:

a camera disposed at the vehicle and having a field of view forward of the vehicle, said camera capturing image data as the vehicle travels along a road;

a non-imaging sensor disposed at the vehicle and having a field of sensing forward of the vehicle, said non-imaging sensor capturing sensor data as the vehicle travels along the road;

a control comprising at least one data processor operable to process image data captured by said camera and to process sensor data captured by said non-imaging sensor;

wherein said control is operable, via processing at said at least one data processor of sensor data captured by said non-imaging sensor, to detect an object in the field of sensing of said non-imaging sensor ahead of and being approached by the vehicle as the vehicle travels along the road;

wherein said control determines a first distance to the detected object when said control first determines presence of the object in the field of sensing of said non-imaging sensor based on processing at said at least one data processor of sensor data captured by said non-imaging sensor;

wherein said control, responsive to processing at said at least one data processor of image data captured by said camera, determines presence of the object in the field of view of the camera as the vehicle travels further along the road after determining the first distance to the detected object;

wherein said control determines a second distance to the detected object when said control first determines presence of the object within the field of view of said camera based on processing at said at least one data processor of image data captured by said camera;

wherein said control determines that fog is present ahead of the vehicle responsive to difference between the determined second distance and the determined first distance being at or above a threshold amount; and wherein, responsive to determination that fog is present ahead of the vehicle, said control at least one selected from the group consisting of (i) actuates fog lights of the vehicle and (ii) adjusts an adaptive cruise control system of the vehicle.

19. The fog detecting system of claim 18, wherein said non-imaging sensor comprises a RADAR sensor.

20. The fog detecting system of claim 18, wherein said control, responsive to processing at said at least one data processor of image data capture by said camera, detects a headlight halo, and wherein said control, responsive to processing of image data captured by said camera, determines an intensity of the detected headlight halo, and wherein said control, responsive to the determined headlight halo intensity, determines a fog density of the determined fog.

* * * * *